United States Patent [19]

Peck et al.

[11] Patent Number: 5,190,207
[45] Date of Patent: Mar. 2, 1993

[54] METHOD FOR WELDING RECTANGULAR TUBES

[75] Inventors: Donald R. Peck, Clive; Arman P. Mortale; Leo W. Riegel, both of Ankeny, all of Iowa

[73] Assignee: Deere & Company, Moline, Ill.

[21] Appl. No.: 892,097

[22] Filed: Jun. 2, 1992

[51] Int. Cl.5 ............................................. B23K 31/02
[52] U.S. Cl. .................................... 228/170; 228/182; 403/14; 403/272
[58] Field of Search ...................... 228/164, 170, 182; 403/13, 14, 272

[56] References Cited

U.S. PATENT DOCUMENTS 3,062,567 11/1962 DeWitt ........................... 228/170 X
3,720,995 3/1973 Brown et al. ........................ 228/170
3,751,792 8/1973 Frakes ................................ 228/170

*Primary Examiner*—Kenneth J. Ramsey

[57] ABSTRACT

A first tube of rectangular cross section is joined to a second tube by notching the first tube on two sides to assure that the top and bottom walls of the first tube touch the rounded corner of the second tube at a central location to define a weld receiving groove and to eliminate the gap between the abutted tubes for repeatable, well defined welds. To avoid large fixtures and structural locators adjacent a weld location, a small tab is provided in the notched end of the first tube. An oversized laser-cut slot in the side of the second tube receives the tab and has one slot boundary precisely located with respect to a reference point on the second tube. The first tube is urged in the direction to force the tab against the boundary and positively locate the first tube with respect to the reference point.

19 Claims, 1 Drawing Sheet

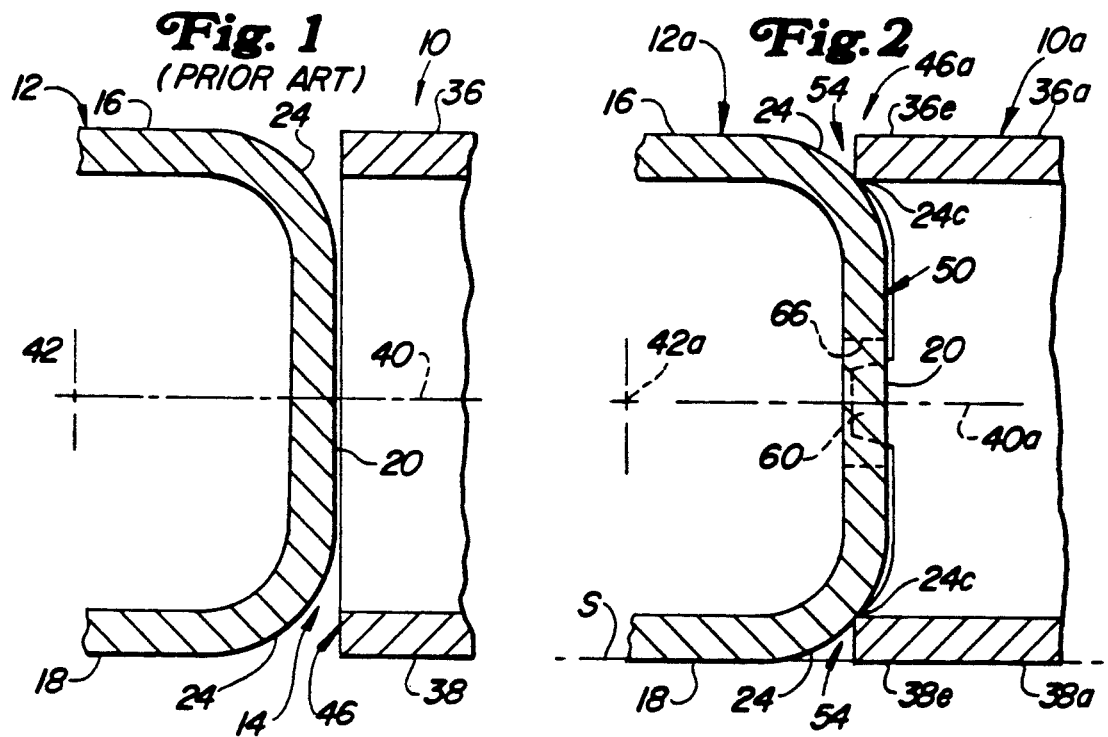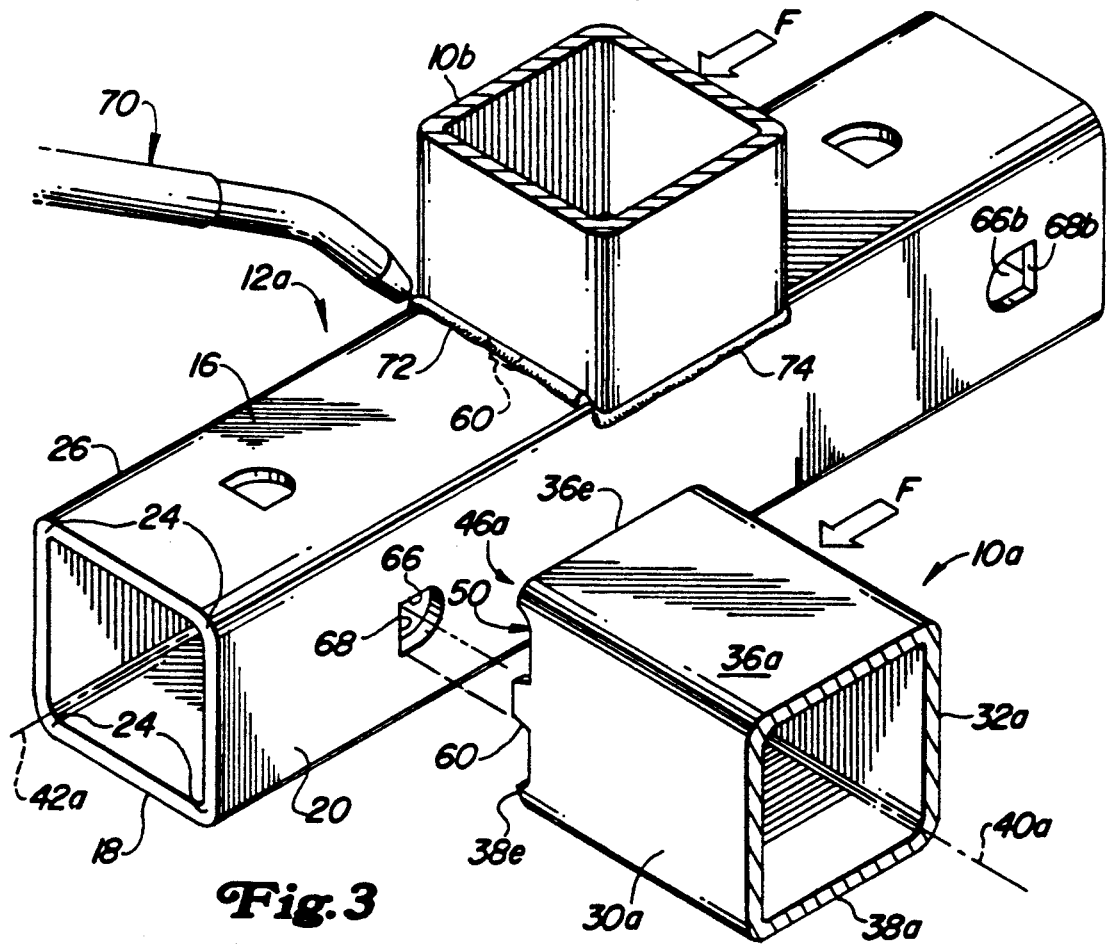

METHOD FOR WELDING RECTANGULAR TUBES

BACKGROUND OF THE INVENTION

1) Field of the Invention

The present invention relates generally to welding of tubular members and more specifically to positively locating tubular members of rectangular cross section and providing an economical, high quality weld.

2) Related Art

Welded frames such as used in the manufacture of agricultural tillage equipment typically include a number of T-joints created by laterally joining a square cut tube with an equal height rectangular or square cut tube (see tubes 10 and 12, respectively, of FIG. 1). As can be appreciated from FIG. 1, the mating of the square cut end on the tube 10 to the varying radius or rounded corner of the adjoining tube leaves a relatively large, variable gap 14 which must be filled with weld material to produce a quality weld. The thicker the walls of the tubes, the larger the radius will be, and use of fill material and numerous passes of weld are required to provide a good joint. A weak weld joint often results when care is not taken to fill the large variable gap 14.

Accurate positioning of the tubes 10 and 12 require large elaborate weld fixtures with structural locators located as close to the joints as possible. The fixture typically hinders weld gun accessibility to the joints, which results in poor, missing or expensive welds.

BRIEF SUMMARY OF THE INVENTION

It is therefore an object of the present invention to provide an improved method for fabricating a joint from tubular metal stock which overcomes the aforementioned problems.

It is yet another object to provide an improved method for fabricating a joint from tubular metal stock which eliminates the need for elaborate weld fixtures. It is a further object to provide such a method which assures easy and accurate positioning of components and a predictable configuration particularly suited to robotic welding techniques. It is yet another object to provide such a method for use with tubing of rectangular cross section and rounded corners, wherein large gaps between components at the weld locations are eliminated so gap fillers and/or multiple welds are not required.

A first tube of rectangular cross section is joined to a second tube by notching or indenting the first tube on two sides to assure that the top and bottom walls of the first tube touch or nearly touch the rounded corners of the second tube at a central locations on the corners to define weld receiving grooves with generally closed vertices to eliminate the gap between the abutted tubes for repeatable, well defined welds. To avoid large fixtures and structural locators adjacent a weld location, a small locating tab is provided in the notched end of the first tube which mates with an oversized laser-cut slot in the side of the second tube. The slot receives the tab and has one slot boundary precisely located with respect to a reference point on the second tube. The first tube is urged in the direction to force the tab against the boundary and positively locate the first tube with respect to the reference point.

The ends of the first tube walls which abut the rounded corners are cut substantially perpendicular to the walls and, with the outermost portions of the rounded corners of the second tube, define an area which facilitates a high quality groove weld with only one or two passes of the weld tool. The components to be welded can be precisely located without large fixtures or locators adjacent the weld points. As a result, robotic techniques are more easily implemented.

These and other objects, features and advantages of the present invention will become apparent to one skilled in the art upon reading the following detailed description in view of the drawings.

BRIEF DESCRIPTION OF THE DRAWINGS

FIG. 1 is a view in section of a conventional T-joint typical of the prior art.

FIG. 2 is a view similar to FIG. 1 but showing the improved T-joint arrangement of the present invention.

FIG. 3 is a perspective view, partially exploded, showing the T-joint construction.

DETAILED DESCRIPTION OF THE DRAWINGS

A. The Prior Art

Referring now to FIG. 1, therein is shown the typical abutting arrangement of the first and second tubes 10 and 12 in a conventional T-joint construction. The tubes 10 and 12 have major axes 40 and 42. The tube 12, which is square or rectangular in cross section, includes top and bottom parallel walls 16 and 18 and front and rear parallel sides 20 and 22 joined by rounded corners 24.

The tube 10 which abuts the side 20 of the tube 12 is also square or rectangular in cross section. Front and rear sides 30 and 32 are joined by rounded corners 34 to top and bottom walls 36 and 38. In a typical T-construction as shown in FIG. 1, the abutting end (indicated generally at 46) of the tube 10 is square cut and held against the side 20 of the tube 12 by weld fixtures (not shown) with the major axes 40 and 42 perpendicular to each other. Filler material (not shown) is usually placed in the gaps 14 prior to making numerous welding passes.

B. Detailed Description of the Invention

Referring now to FIGS. 2 and 3, a tube 10a includes sides 30a and 32a having an abutting end 46a. The sides 30a and 32a of the end 46a are notched at locations 50 to define top and bottom wall extensions 36e and 38e that project from the top and bottom walls 36a and 38a. The outermost faces of the extensions 36e and 38e lie in a vertical plane perpendicular to the tube axis 40a (FIG. 2), and parallel to but offset inwardly from the side 20 of the tube 12a.

The notches at 50 are cut to substantially conform to the shape of the side of the tube 12a from central locations on the rounded corners 24 and along the side 20 and to permit the inner edges of the extensions 36e and 38e to contact or nearly contact (i.e., no more than about a 0.020 inch offset from) central locations 24c on the rounded corners 24. As best seen in FIG. 2, the configuration of the abutting end 46a defines, with the rounded corners 24 at the side 20 of the tube 12a, generally V-shaped weld grooves 54 with substantially closed vertices running nearly the width of the tube 10a between the sides 30a and 32a. A slight gap, preferably less than about 0.060 inch, exists between the notch locations 50 of the tube 10a and the side 20 of the tube 12a to assure a close fit (i.e., less than about 0.020 inch offset) between the extensions 36e and 38e and the corresponding corners 24.

A positioning tab 60 is provided in one side (side 30a as seen in FIG. 3) by leaving an axially extending central portion of the corresponding notch 50. The top and bottom of the tab are slightly tapered so the height of the tab decreases axially in the direction of the edges to facilitate assembly. A mating aperture 66 is cut in the side 20 of the tube 12a to receive the tab 60 during initial fabrication of the T-joint. The aperture 66 is substantially larger than the tab 60 and includes an outside boundary 68 which is precisely located axially along the side 20 with respect to a reference point on the tube 12a. The reference point may be any convenient point on the tube 12a, such as an end or another located boundary 68b on a second aperture 66b (FIG. 3). The tab 60 and aperture 66 help to quickly and easily locate the tube 10a axially with respect to the tube 12a.

Once the tab 60 is inserted into the aperture 66, the tube end 46a is urged in the direction of the axis 40 against the side 20 to form the grooves 54 with generally closed vertices. A force (arrow F) perpendicular to the axis 40a is applied to the tube 10a to move the outer surface of the tab 60 against the precisely located boundary 68 of the aperture 66 to thereby establish a close tolerance fit between the tubes 10a and 12a. The tubes 10a and 12a preferably are supported on a planar surface (S of FIG. 2) for aiding vertical alignment. Since the height of the aperture 66 is greater than the height of the tab 60, the tab is free to move vertically relative to the aperture for proper vertical alignment of the tubes independently of the tab. The boundary 68 retains proper location of the tube 10a along the length of the tube 12a.

The tubes 10a and 12a are held in their positions with a relatively high degree of precision by relatively simple, conventional fixtures (not shown) offset from the joint location. A welding tip 70 is then utilized to lay a fillet weld 72 (see the weld on the tube 10b of FIG. 3) along the notch locations 50 and the corresponding wall or side on the second tube 12a. The welding tip 70 provides a groove weld 74 in the groove 54 in one or two passes. Since a fillet weld is more forgiving to a gap than a groove weld, a welding advantage is obtained by providing the larger gap tolerance on between the notch location 50 and the tube side so that the vertices of the grooves 54 will be closed or substantially closed.

Preferably, the end 46a with the extensions 36e and 38e and the tab 60, and the aperture 66, are formed utilizing a laser cutting process. The tip 70 is part of a robotic welding assembly. The tubes 10a and 12a may be part of a main frame member or other similar structure typically fabricated from elongated tubing of rectangular cross section. The abutting end 46a of the tube 10a may be cut at an angle of other than 90°, for example, to provide diagonal frame members. Notch locations 50 for diagonal members are generally shaped the same as shown in FIGS. 2 and 3, but the notch location for one of the sides 30a and 32a will be offset axially ahead of the notch location for the opposite side. For best results, the tab 60 is located on the side of the tube 10a that corresponds to the acute angle between the diagonal member 10a and the second tube 12a to assure that the outside surface of the tab 60 abuts against the outside surface of the locating boundary 68. This assures minimum possible offset of the tube side from the locating boundary for most accurate component placement.

Having described the preferred embodiment, it will become apparent that various modifications can be made without departing from the scope of the invention as defined in the accompanying claims. Also, the references herein to top, bottom and sides relating to tube orientation are merely for purposes of describing the structure in relation to the drawings, and it is to be understood that actual orientation may differ without departing from the scope of the invention.

We claim:

1. A method of welding a first elongated tube of rectangular cross section to a second elongated tube of rectangular cross section, wherein the tubes have upper and lower walls joined by opposite sides with rounded corners having radii of curvature joining the sides and the upper and lower walls, the method comprising:

notching the opposite sides of one end of the first tube with a shape complimentary to the side of the second tube;

supporting the notched end of the first tube against the side of the second tube so that the upper and lower walls of the first tube touch or are in close proximity to the rounded corners of the second tube;

welding the upper and lower walls of the first tube to the rounded corners of the second tube; and precisely locating the first tube relative to the second tube, the step of precisely locating including:

providing a tab in one the notched sides of the first tube and providing a mating hole in the side of the second tube; and inserting the tab into the hole.

2. The method as set forth in claim 1 wherein the step of precisely locating includes locating the first tube axially with respect to the second tube utilizing the tab and the hole, wherein the step of providing the hole includes precisely locating one boundary of the hole relative to the length of the second tube, and forcing the tab against the one boundary of the hole.

3. The method as set forth in claim 2 wherein the step of precisely locating includes supporting the first and second tubes on a planar surface.

4. The method as set forth in claim 3 wherein the step of providing a mating hole includes making the hole substantially larger in the direction perpendicular to the planar surface than the corresponding dimension of the tab, and the step of supporting the first and second tubes on the planar surface includes locating the first and second tubes relative to each other in the vertical direction.

5. A method of welding a first elongated tube of rectangular cross section to a second elongated tube of rectangular cross section, wherein the tubes have upper and lower walls joined by opposite sides with rounded corners having radii of curvature joining the sides and the upper and lower walls, the method comprising:

notching the opposite sides of one end of the first tube with a shape complimentary to the side of the second tube;

providing an axially extending locator in the notched end of the first tube and providing a complimentary locator-receiving portion in the side of the second tube;

supporting the notched end of the first tube against the side of the second tube so that the locator and locator-receiving portions are in contact for positioning the first and second tubes relative to each other, and so that the upper and lower walls of the first tube touch or are in close proximity to the rounded corners of the second tube; and welding the upper and lower walls of the first tube to the rounded corners of the second tube.

6. The method as set forth in claim 5 wherein the locator is provided during the step of notching by leaving an axially extending central portion in one of the sides of the notched end, and further comprising the step of supporting the notched sides closely adjacent the side of the second tube and welding the notched sides to the side of the second tube.

7. The method as set forth claim 5 wherein the step of notching the opposite sides of the first tube includes providing ends on the top and bottom walls of the notched end of the tube which are substantially perpendicular to said top and bottom walls, and, with the rounded corners, define a top and a bottom weld receiving groove.

8. The method as set forth in claim 7 wherein the step of welding includes providing a groove weld in the groove.

9. The method as set forth in claim 8 wherein the step of welding further includes providing a fillet weld between the notched ends and the side of the second tube.

10. The method as set forth in claim 5 wherein the step of supporting the notched end of the first tube against the side of the second tube includes supporting the upper and lower walls of the first tube a distance less than or equal to approximately .020 inch from the rounded corners of the second tube and supporting the notched sides of the first tube a distance of approximately .060 inch or less from the side of the second tube, and wherein the step of welding includes providing a groove weld between the upper and lower walls of the of first tube and the rounded corners of the first tube, and providing a fillet weld between the notched sides of the first tube and the side of the second tube.

11. A method of welding a first elongated tube of rectangular cross section to a second elongated tube of rectangular cross section, wherein the tubes have upper and lower walls joined by opposite sidewalls with rounded corners, the method comprising:

forming the opposite sides of one end of the first tube so that the upper and lower walls have ends which project beyond the ends of the sides of the first tube, said step of cutting including cutting the upper and lower wall ends of the first tube at substantially a right angle to the plane of the walls of the first tube;

supporting the upper and lower wall ends of the first tube in contact with or closely adjacent the rounded corners thereby defining with the rounded corners upper and lower weld-receiving grooves;

providing a groove weld in the upper and lower weld-receiving grooves independently of any filler in the weld-receiving grooves;

supporting the cut sides of the end of the first tube against the side of the second tube;

providing a fillet weld between the cut sides of the first tube and the side of the second tube;

wherein the step of forming includes providing a locating tab in the end of one of the sides of the first tube; and further including the steps of providing a locator hole in the side of the second tube and inserting the tab in the hole.

12. The method as set forth in claim 11 wherein the step of providing a locator hole includes precisely locating one boundary of the locator hole with respect to the second tube, and the step of inserting includes forcing the tab against said one boundary.

13. The method as set forth in claim 12 wherein the step of providing a locator hole comprises cutting a hole substantially larger than the tab, and further including the step of aligning the first and second tubes in one plane by supporting the lower walls of the first and second tubes on a planar surface.

14. A method of manufacturing a frame from elongated tubing of rectangular cross section, wherein the tubing has upper and lower walls running parallel to each other and to the elongate axis, the walls joined by sides with rounded corners, the method comprising:

providing indentations on the sides of a first piece of tubing at one end of the first piece of tubing conforming generally to the cross section of one side of a second piece of tubing, the cross section extending between the central location on the corners of said one side of the second piece of tubing;

providing a projection on at least one of the upper and lower walls of said one end of the first piece of tubing;

supporting said one end of the first piece of tubing against the one side of the second piece of tubing with the projection in close proximity to or touching the rounded corner of the second piece of tubing thereby defining a groove between the projection and rounded corner and with the indentations in close proximity to or touching the one side of the second piece of tubing;

welding the first and second pieces of tubing together, the step of welding including providing a groove weld in the groove between the projection and the rounded corner; and further including the steps of:

providing a tab on one side of the first piece of tubing at the corresponding indentation;

providing a tab receiving portion on the one side of the second piece of tubing; and locating the first and second pieces of tubing utilizing the tab and tab receiving portions.

15. The method as set forth in claim 14 wherein the step of providing a tab receiving portion includes providing an aperture in the one side of the second piece of tubing which is substantially larger than the tab, and wherein the step of locating includes urging the tab against one side of the aperture.

16. The method as set forth in claim 15 wherein the step of providing indentations includes providing an indentation on one side of the first piece of tubing offset axially ahead of the indentation on the other side so that the an acute angle is formed between the first and second pieces of tubing when the pieces are supported against each other, and wherein the step of providing a tab includes providing the tab on the side of the first tubing which forms the acute angle with the second piece of tubing.

17. The method as set forth in claim 18 wherein the step of providing a projection on at least one of the upper and lower walls of said one end of the first piece of tubing includes providing a projection edge at the end of the tubing which is substantially perpendicular to the plane of the corresponding wall so that the resulting groove defined by the projection and rounded corner includes one boundary generally parallel to the one side of the second piece of tubing.

18. A method of manufacturing a frame from elongated tubing of rectangular cross section, wherein the tubing has upper and lower walls running parallel to each other and to the elongate axis, the walls joined by sides with rounded corners, the method comprising:
   cutting an abutting end on the first piece of tubing, said step of cutting including providing a projecting tab on one of the sides of the first piece of tubing;
   cutting an aperture in one side of the second piece of tubing substantially larger than the tab, the step of cutting including providing one boundary of the aperture at a precise location relative to a reference point on the second piece of tubing;
   supporting the abutting end of the first piece of tubing against the one side of the second piece of tubing which is apertured with the tab inserted in the aperture;
   precisely locating the first piece of tubing with respect to the reference point by urging the tab against the boundary; and
   welding the first and second pieces of tubing together, the step of welding includes providing a groove weld in the groove between the projection and the rounded corner.

19. The method as set forth in claim 18 wherein the step of precisely locating includes supporting one wall of the first piece of tubing and the corresponding wall of the second piece of tubing on a planar surface.

* * * * *

UNITED STATES PATENT AND TRADEMARK OFFICE
CERTIFICATE OF CORRECTION

PATENT NO. : 5,190,207

DATED : 2 March 1993

INVENTOR(S) : Donald Ray Peck et al.

It is certified that error appears in the above-identified patent and that said Letters Patent is hereby corrected as shown below:

Column 6, line 60, delete "18" and insert therefor --14--.

Signed and Sealed this

Eleventh Day of January, 1994

Attest:

BRUCE LEHMAN

*Attesting Officer*    *Commissioner of Patents and Trademarks*